(12) United States Patent
Stephenson et al.

(10) Patent No.: US 9,071,116 B2
(45) Date of Patent: Jun. 30, 2015

(54) APPARATUS FOR INSTALLING STATOR WINDING CONDUCTORS

(71) Applicant: Remy Technologies, LLC, Pendleton, IN (US)

(72) Inventors: Mark Stephenson, Fairland, IN (US); John Chen, Canton, MI (US)

(73) Assignee: Remy Technologies, LLC, Pendleton, IN (US)

( * ) Notice: Subject to any disclaimer, the term of this patent is extended or adjusted under 35 U.S.C. 154(b) by 254 days.

(21) Appl. No.: 13/743,710

(22) Filed: Jan. 17, 2013

(65) Prior Publication Data
US 2014/0196282 A1    Jul. 17, 2014

(51) Int. Cl.
    *B23P 19/00*      (2006.01)
    *H02K 15/00*      (2006.01)
    *H02K 15/06*      (2006.01)

(52) U.S. Cl.
    CPC ......... *H02K 15/066* (2013.01); *Y10T 29/53143* (2015.01); *Y10T 29/49117* (2015.01)

(58) Field of Classification Search
    CPC .................. Y10T 29/53143; Y10T 29/49009; Y10T 29/49071; Y10T 29/53478; Y10T 29/49073
    USPC ........... 29/732, 596, 597, 598, 605, 606, 734, 29/735, 736, 820
    See application file for complete search history.

(56) References Cited

U.S. PATENT DOCUMENTS

| | | | |
|---|---|---|---|
| 1,798,980 A | 3/1931 | Kayser | |
| 2,011,114 A | 8/1935 | Papin | |
| 2,836,204 A | 5/1958 | Mason | |
| 2,873,514 A | 2/1959 | Mills | |
| 3,191,638 A | 6/1965 | Shmoolevich et al. | |
| 3,192,961 A | 7/1965 | Moore | |
| 3,514,837 A | 6/1970 | Smith | |
| 3,525,147 A | 8/1970 | Kieffer | |
| 3,724,515 A | 4/1973 | Eminger | |
| 3,793,694 A | 2/1974 | Norkaitis | |
| 4,131,988 A | 1/1979 | Finegold | |
| 4,269,235 A | 5/1981 | Muskulus | |
| 5,802,706 A | 9/1998 | Barrett | |

(Continued)

FOREIGN PATENT DOCUMENTS

| | | |
|---|---|---|
| EP | 1 372 242 A2 | 12/2003 |
| GB | 639069 | 6/1950 |

(Continued)

*Primary Examiner* — Thiem Phan
(74) *Attorney, Agent, or Firm* — Bose McKinney & Evans LLP (57) ABSTRACT

An apparatus for installing an elongate conductor into stator core slots, including a magazine having a radially outer cylindrical surface with recesses that extend inwardly of the cylindrical surface, and a circular rack having a radially outer periphery provided with rack slots. The magazine has an installation mode in which a stator core coaxially surrounds the magazine, there is concurrent radial alignment between pairs of magazine recesses and stator core slots, and a conductor axial branch is receivable by a stator slot from a respectively paired magazine recess; and a load mode in which the circular rack and the magazine have synchronized rotative movements, corresponding pairs of magazine recesses and rack slots are sequentially aligned, and a conductor axial branch is receivable by a magazine recess from its aligned rack slot. Also, a method for loading an elongate conductor onto a magazine for subsequent installation into stator core slots.

12 Claims, 4 Drawing Sheets

(56) References Cited

U.S. PATENT DOCUMENTS

| | | |
|---|---|---|
| 6,619,578 B2 | 9/2003 | Stockman et al. |
| 6,901,649 B2 | 6/2005 | Imori et al. |
| 7,275,299 B2 * | 10/2007 | Kuroyanagi et al. ........... 29/596 |
| 7,337,525 B2 | 3/2008 | Ueda et al. |
| 7,367,106 B2 * | 5/2008 | Becherucci et al. ............ 29/596 |
| 2009/0072653 A1 | 3/2009 | Harada et al. |
| 2009/0121576 A1 | 5/2009 | Even et al. |
| 2012/0112597 A1 | 5/2012 | Becherucci et al. |

FOREIGN PATENT DOCUMENTS

| | | |
|---|---|---|
| GB | 1 274 561 | 5/1972 |
| GB | 1 419 449 | 12/1975 |
| WO | WO 86/01049 A1 | 2/1986 |

* cited by examiner

APPARATUS FOR INSTALLING STATOR WINDING CONDUCTORS

BACKGROUND

The present disclosure relates to rotary electric machines such as electric motors or generators, particularly of the polyphase type, and, more particularly, to apparatuses and methods for manufacturing multiple-pole stators used therein.

Rotary electric machines operate by exploiting the interaction of rotating magnetic fields with a rotor carrying magnets, the rotor disposed within and rotatable relative to a stator. The rotor is typically fixed to a shaft mounted for rotation centrally by means of bearings in a casing that surrounds the stator. These machines include armatures or a configuration of insulated wire coils in the stator, which are distributed about the stator central axis, the coils arranged in a progressive sequence to define the different phases. The stator coil windings are typically wound around ferromagnetic poles of the stator to enhance the strength of the generated magnetic field. The poles generally are tooth-like cross sections that are usually rectangular or trapezoidal, and typically defined by longitudinal slots in the stator core.

In a polyphase electric motor, flowing current of different phases through a progressive sequence of wire coils in the stator generates rotating magnetic fields in the stator, which impart electromechanical torque to the rotor and its shaft. Conversely, in a polyphase electric generator, externally forced rotation of the shaft and rotor imparts rotation to magnetic fields that induce current flows in the stator coils.

As is well-known in the relevant art, the stator may have a stator core defined by a stack of interlocked, ferrous laminae each having a hole, the holes being aligned in the lamina stack to form a stator core central bore. Thus, the stator core may be a unitary annular member, its central bore defining a stator core radially internal face that is typically cylindrical and centered about a stator central axis. The radially internal face is typically provided with a plurality of generally axially extending elongate slots formed by aligned, notched portions of the laminae holes. The stator slots pass axially through the lamina stack adjacent the central bore since they extend over the entire axial length of the lamina stack and are open radially on an internal side and the two opposite axial ends. The stator slots extend between the axially opposite ends of the stator core and define the stator poles. The slots formed by the lamina stack may lie in planes that intersect along and contain the stator central axis, but are sometimes inclined with respect to that axis. It may nevertheless be said that the stator core slots are generally parallel with the stator central axis. The plurality of stator slots is typically distributed at an even pitch about the stator central axis. Relative to the stator, radial and axial directions mentioned herein are respective to the stator central axis, and the stator slots generally extend radially outwardly from and axially along the stator central axis.

Disposed in and extending along these stator slots are elongate electrical conductors that define the stator coil windings. By virtue of the conductors being routed through the stator slots, they are wrapped about the stator poles. Typically, a stator slot insulator insert is interposed between the conductors and the edges of the stator slots to ensure electrical isolation of the stator coil from the stator core. The insulator insert is inserted into the slot before a conductor is installed therein.

In a polyphase rotary electric machine, the stator coil windings include a plurality of (typically three) different phase windings each consisting of a continuous, elongate electrical conductor, such as a wire or bar. The conductor may, for example, be made from copper covered with an insulator such as enamel. Alternatively, each phase winding may include an interconnected plurality of such conductors. Conventional wire sizes may be used for the conductors of the wire coils. Optionally, thick bar conductors can be used for making a wire coil with a designed current-carrying capacity requiring fewer turns than is possible with smaller size wire. The conductor cross-section is typically circular or rectangular (including square).

The stator slots may have a radial depth that is a multiple of the cross-sectional dimension of the conductor in the slot's radial direction. In an example three-phase stator, two electrical conductor lengths may be housed within each of the stator slots so as to line up in one row in a radial direction. The electrical conductors are arranged in a predetermined winding pattern to form the stator winding. The particular winding patterns of stator windings may vary considerably between different machine designs, and are generally beyond the scope of the present disclosure.

Thus, a stator assembly includes a stator core, a stator winding constituted by a number of electrical conductors disposed inside slots formed in the stator core, and inserted insulators providing electrical insulation between the stator core and the electrical conductors.

For example, in a three-phase machine having eighty-four stator slots, there are three slot groups, one for each phase, each having twenty-eight slots in which are disposed the conductors of a single current phase. The twenty-eight slots of each slot group or current phase, may be distributed about the stator central axis in, for example, seven equal sets of four circumferentially adjacent slots. Such is a typical example that would be well-understood by one of ordinary skill in the relevant art. Further, each of the three phase windings may consist of a single formed conductor, or an interconnected plurality of formed conductors.

Prior to their installation, the stator winding conductors are formed by bending lengths of the elongate conductors into shapes defining elongate straight portions, herein also referred to as conductor axial branches, that are installed into the stator slots. The axial branches of a conductor are serially connected by relatively shorter head branches, which are conductor portions that generally extend tangentially relative to the stator bore. Depending on its number of axial branches, a formed conductor's pair of connection segments may have more than one head branch disposed therebetween. The head branches typically lie outside of the stator slots, and outside of the stator bore, at one or both axial ends of the stator core. These undulating conductors are thus said to be of the "S-type" and "wave-wound" about the stator poles.

The longitudinal ends of each formed conductor are commonly referred to as its connection segments, and are each typically located at a longitudinal end of an axial branch opposite a connected head branch, at an axial end of the stator core, and preferably at a common stator core axial end. Locating the connection segments of a stator winding at a common axial end of the stator core facilitates their being quickly and easily interconnected. The connection segments of a plurality of conductors in the same phase winding may be interconnected prior, or subsequent, to the stator winding conductors being installed in the stator slots. The interconnection of the connection segments of a phase winding may be done directly, such as through a suitable joining process, for example by soldering or a crimped connector; or indirectly such as through a buss bar assembly. Interconnection of conductors via a buss bar assembly is done subsequent to the installation of the windings into the stator core.

The stator core slot openings may have a circumferential width corresponding to the circumferential width of the conductor wire; the opening may have a circumferential width substantially equal to the corresponding cross-sectional dimension of the conductor. Retention of the coil windings in the stator core may be done by deforming the axial branch occupying the radially innermost position to broaden it in a circumferential direction, relative to the stator central axis, at a plurality of discrete locations axially therealong. The deformation of the conductor compresses it against the opposite sides of its stator slot and holds it, and conductor axial branches occupying the other positions, inside the stator slot. Alternatively, once the coil windings have been inserted into the stator slots, insulating covers may be installed over the stator slots to mechanically retain the conductors in position. Alternatively, or additionally, an insulating resin is applied to the assembly of the stator core and the installed windings to connect the conductors together, and to fix the conductors to and insulate them from the stator core.

Insertion of the stator coil windings into the stator core slots may be from a cylindrical magazine, also referred to in the art as a slotted bobbin or dummy rotor, onto which the conductors have been loaded, and which is insertable into the bore of the stator core. Such a magazine, while outside of the stator bore, is loaded with the conductors of the stator windings in an arrangement corresponding to, e.g., generally radially reversed relative to, their desired configurations in the resulting stator. The conductors loaded onto the magazine may be partially or fully preformed as described above, or may be formed on the magazine, which serves as a mandrel as well as a carrier of the formed conductors and an aid to their insertion into the stator core slots. Such magazines are well known in the art; they typically include a cylindrical part having a radially external surface in which is provided a plurality of radial recesses extending in respective radial planes equiangularly distributed around the central axis of the magazine. The magazine recesses also extend between the axially opposite ends of the generally cylindrical magazine. The radial recesses in the magazine are equal in number to the number of slots in the stator.

The magazine, once loaded with formed conductors arranged in a desired winding pattern, has an insertion mode in which the magazine has been disposed within the cylindrical stator core bore, with the magazine recesses aligned with the stator slots in the surrounding, radially inner cylindrical surface of the stator core bore. The radial disposition of the conductor axial branches carried by the magazine recesses, correspond to their radial disposition in the resulting stator assembly. Thus, relative to the magazine, the magazine-to-stator core conductor transference may be described as being according to a last-in-first-out or LIFO system. The magazine has radial blade members moveably disposed in the magazine recesses. The blade members are used to push the arranged, preformed conductors carried by the magazine radially outwardly from the recesses, away from the magazine central axis and towards the stator core bore, and press the axial branches into the stator slots.

A known magazine, winding installation method, and apparatus suitable for insertion of windings into stator slots are described in U.S. Pat. No. 2,873,514, issued Feb. 17, 1959, the disclosure of which is incorporated herein by reference.

Methods and apparatuses that streamline prior stator assembly processes and facilitate greater speed and efficiency thereof would be desirable advancements in the relevant art.

SUMMARY

A method and apparatus according to the present disclosure provides such an advancement.

In accordance with the present disclosure, the stator coil conductors are placed into slots located on the outer perimeter of a circular rack. The placed conductors may first be preformed, or shaped on a mandrel, and subsequently transferred to the circular rack. Alternatively, unformed conductors may be placed into the slots of the circular rack, and formed thereon; that is, in some embodiments the rack may itself serve as a mandrel.

The shaped conductors, positioned relative to each other in the slots of the circular rack in a pattern that corresponds to their desired arrangement in a resultant stator assembly, are subsequently transferred from the rack to a generally cylindrical magazine of the type described above. Relative to the circular rack, the magazine has a load mode in which conductor transference therebetween occurs. The loaded magazine is receivable into the central bore of a stator core for transference of the formed conductors carried by the magazine to the stator core slots as described above, in a magazine installation mode.

The apparatus and method disclosed herein may be adapted to the manufacture of stator assemblies having any number of stator core slots, and to stator coils having any number of phases and winding patterns.

The present disclosure provides an apparatus for installing an elongate conductor having a plurality of axial branches into stator core slots that extend outwardly into the cylindrical surface of a stator core bore. The apparatus includes a magazine having a central axis and a radially outer cylindrical surface disposed thereabout, the magazine provided with a plurality of recesses that extend inwardly of the cylindrical surface towards the central axis. The apparatus also includes a circular rack having a radially outer periphery provided with a plurality of rack slots, the magazine and circular rack each capable of carrying at least one conductor intended for installation into a plurality of stator core slots. The magazine has an installation mode in which a stator core coaxially surrounds the magazine, there is concurrent radial alignment between each of a plurality of pairs of magazine recesses and stator core slots, and at least one conductor axial branch is receivable by a stator core slot from a respectively paired magazine recess. The magazine also has a load mode in which the circular rack and the magazine have synchronized rotative movements, corresponding pairs magazine recesses and rack slots are sequentially aligned, and at least one conductor axial branch is receivable by a magazine recess from its aligned rack slot.

A further aspect of this disclosure is that the magazine also includes at least one blade member defining within each respective recess a floor movable substantially radially relative to the cylindrical surface. A conductor axial branch receivable into a stator core slot in the magazine installation mode is urged radially away from the magazine central axis and into the stator slot by the blade member in the magazine installation mode.

A further aspect of this disclosure is that the magazine recesses and the rack slots have substantially identical circumferential widths.

A further aspect of this disclosure is that circumferentially adjacent magazine recesses and rack slots are respectively spaced circumferentially at substantially identical distances.

A further aspect of this disclosure is that the circular rack has an axis of rotation, the rack axis of rotation and magazine central axis substantially parallel in the magazine load mode.

A further aspect of this disclosure is that the circular rack has an axis of rotation, adjacent rack slots extend in substantially parallel slot directions relative to each other, and the rack axis of rotation and each slot direction are oriented in different directions.

A further aspect of this disclosure is that, in the magazine load mode, the circular rack perimeter and the magazine cylindrical surface interface through a transfer plane tangential to the circular rack perimeter and the magazine cylindrical surface, and each conductor axial branch receivable by a magazine recess from its aligned rack slot is transferrable from the circular rack to the magazine through the transfer plane.

A further aspect of this disclosure is that the circular rack perimeter is concentric with a rack axis of rotation, and the transfer plane is parallel with the rack axis of rotation and the magazine central axis.

A further aspect of this disclosure is that the apparatus also includes a ramp surface axially adjacent the circular rack perimeter and facing towards the magazine cylindrical surface in the magazine load mode. The ramp surface is capable of being slidably engaged by conductors carried by the circular rack. The axial branch of a conductor slidably engagable with the ramp surface is urged by the ramp surface from a rack slot into its aligned magazine recess in response to rotative movements of the circular rack in the magazine load mode.

A further aspect of this disclosure is that the number of rack slots is an integer-multiple of the number of magazine recesses.

A further aspect of this disclosure is that, in the magazine load mode, a full complement of conductors for a stator assembly is receivable from the circular rack by the recesses of a magazine through a 360° rotation of the magazine about its central axis.

A further aspect of this disclosure is that the apparatus includes a plurality of magazines circumferentially disposed about the circular rack perimeter in the magazine load mode.

A further aspect of this disclosure is that the plurality of magazines is simultaneously receivable of conductors from the circular rack in the magazine load mode.

A further aspect of this disclosure is that the plurality of magazines is simultaneously disposed in respective stator core bores in the magazine installation mode.

The present disclosure also provides a method for loading an elongate conductor onto a magazine for subsequent installation into stator core slots, including: carrying at least one elongate conductor in a plurality of rack slots provided on the radially outer periphery of a circular rack; rotating the circular rack and a cylindrical surface of a magazine positioned adjacent the circular rack periphery relative to each other in synchronicity; sequentially aligning the rack slots with the respectively paired ones of a plurality of magazine recesses provided in the cylindrical magazine surface during their synchronous relative rotation; and urging an axial branch of the elongate conductor radially outwardly from a rack slot and into the respectively paired magazine recess aligned therewith, whereby the conductor is transferred between the relatively rotating circular rack and the magazine portion-by-portion during sequential alignments of their respectively paired rack slots and magazine recesses.

A further aspect of this disclosure is that the cylindrical magazine surface is selectively positioned adjacent the circular rack periphery in a magazine load mode, and that the method further includes carrying the elongate conductor in the plurality of magazine recesses during transition from the magazine load mode to a magazine installation mode in which the elongate conductor is transferred from the magazine to slots of a stator core surroundingly disposed about the magazine.

A further aspect of this disclosure is that the method includes: slidably engaging the conductor carried by the circular rack against a ramped surface; and displacing from a rack slot and receiving into the magazine recess aligned with the rack slot, the conductor as the conductor slides against the ramped surface.

A further aspect of this disclosure is that the step of rotating includes rotating the circular rack and cylindrical magazine surface about parallel axes.

A further aspect of this disclosure is that the step of slidably engaging the conductor carried by the circular rack against a ramped surface includes slidably engaging a conductor axial branch against ramped surfaces disposed on opposite axial sides of the circular rack.

A further aspect of this disclosure is that the method includes tamping portions of the conductor transferred to the magazine recesses radially inwardly.

A further aspect of this disclosure is that the method includes forming the conductor carried by the circular rack prior to disposing the conductor into rack slots.

A further aspect of this disclosure is that the method includes forming the conductor carried by the circular rack subsequent to disposing the conductor into rack slots.

BRIEF DESCRIPTION OF THE DRAWINGS

The above-mentioned aspects and other characteristics and advantages of an apparatus and/or method according to the present disclosure will become more apparent and will be better understood by reference to the following description of exemplary embodiments taken in conjunction with the accompanying drawings, wherein.

Corresponding reference characters indicate corresponding parts throughout the several views. Although the drawings represent embodiments of the disclosed apparatus and method, the drawings are not necessarily to scale or to the same scale and certain features may be exaggerated or omitted in order to better illustrate and explain the present disclosure. Moreover, in accompanying drawings that show sectional views, cross-hatching of various sectional elements may have been omitted for clarity. It is to be understood that this omission of cross-hatching is for the purpose of clarity in illustration only.

DETAILED DESCRIPTION

The following description is set forth in the context of the manufacture of polyphase, multiple-pole stators for rotary electric machines. The embodiments described below are not intended to be exhaustive or to limit the present disclosure to the precise forms or steps disclosed in the following detailed description. Rather, the embodiments are chosen and described so that others skilled in the art may appreciate and understand the principles and practices of the present disclosure.

An example stator assembly resulting from an assembly process facilitated by and according to the apparatus and method hereby disclosed is substantially as described above, and may be intended for use in a three phase rotary electric machine. It has a number of slots arranged about the stator central axis, with each of the stator slots associated with one of the three current phases. This association progressively repeats itself in sequence around the radially inner face of the cylindrical stator core bore. The stator core is formed of a cylindrical lamina stack having an axial axis of symmetry and axial slots formed in the radially internal face of the lamina stack. The slots are separated from one another by the stator poles. Thus, intercalated sequences of slots are associated with the first, second and third current phases.

The stator poles are suitably designed to accommodate insertion of thick bar conductors in the stator slots, the stator slot opening widths being about the same as the general widths of the stator slots over their entire radial depths. These enlarged slot opening widths allow unrestricted insertion of the conductors into the stator slots. The longitudinal slot passages in the stator core may be generally U-shaped with approximately parallel pole sides. Insulation inserts may line the walls of the stator slots to electrically isolate the conductors inserted therein. These inserts may be made, for example, from plastic sheeting.

The stator slots have a circumferential width that is substantially equivalent to the corresponding, circumferentially extending cross-sectional dimension of the conductor to be inserted therein, plus a clearance of, for example, from about 0.4 to 1.0 mm. The stator slots can have a radial depth into the cylindrical wall of the stator core bore that is a multiple of the corresponding, radially extending cross-sectional dimension of the insertable conductor. The dimensions chosen for the stator slots result in the axial branches of the conductors coming to be stored in several well-ordered radial alignments in the stator slots.

Figure 1:
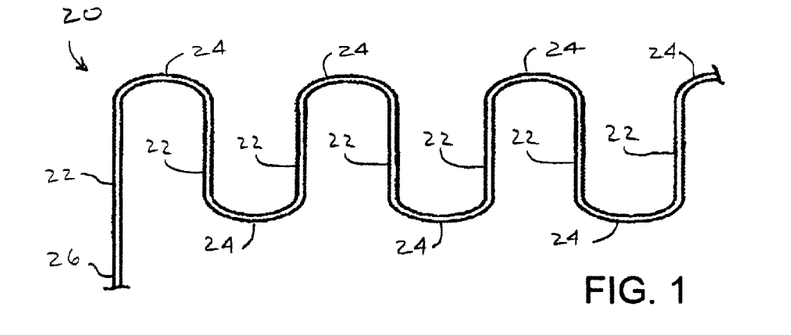
FIG. 1 is a planar projection of portions of an S-style stator winding conductor disposable on a circular rack according to the present disclosure.
Figure 2:
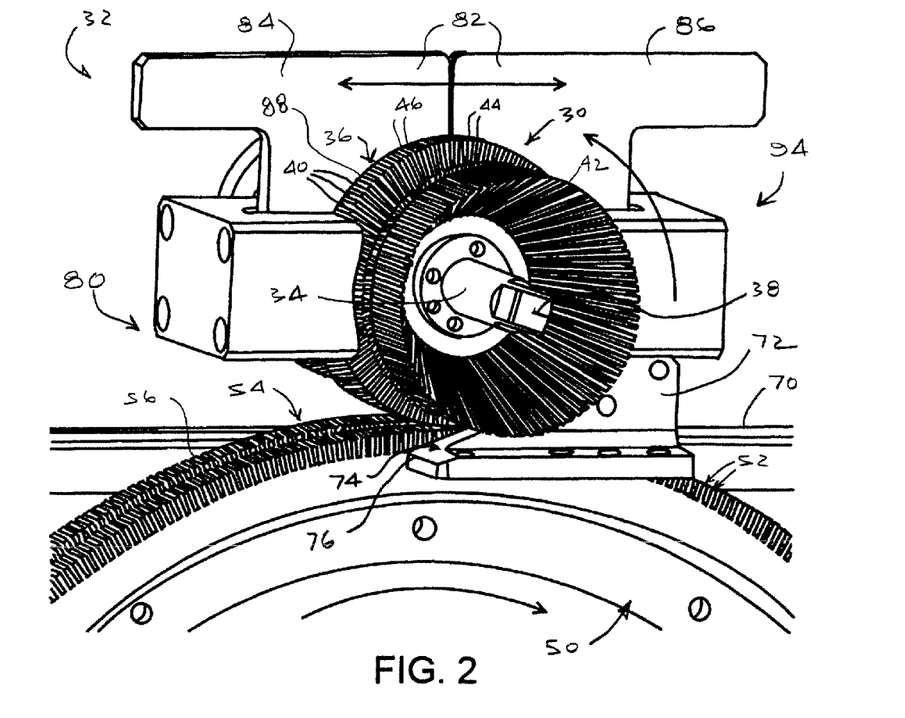
FIG. 2 is a fragmented, partial, perspective view of an apparatus according to one embodiment of the present disclosure.
Figure 3:
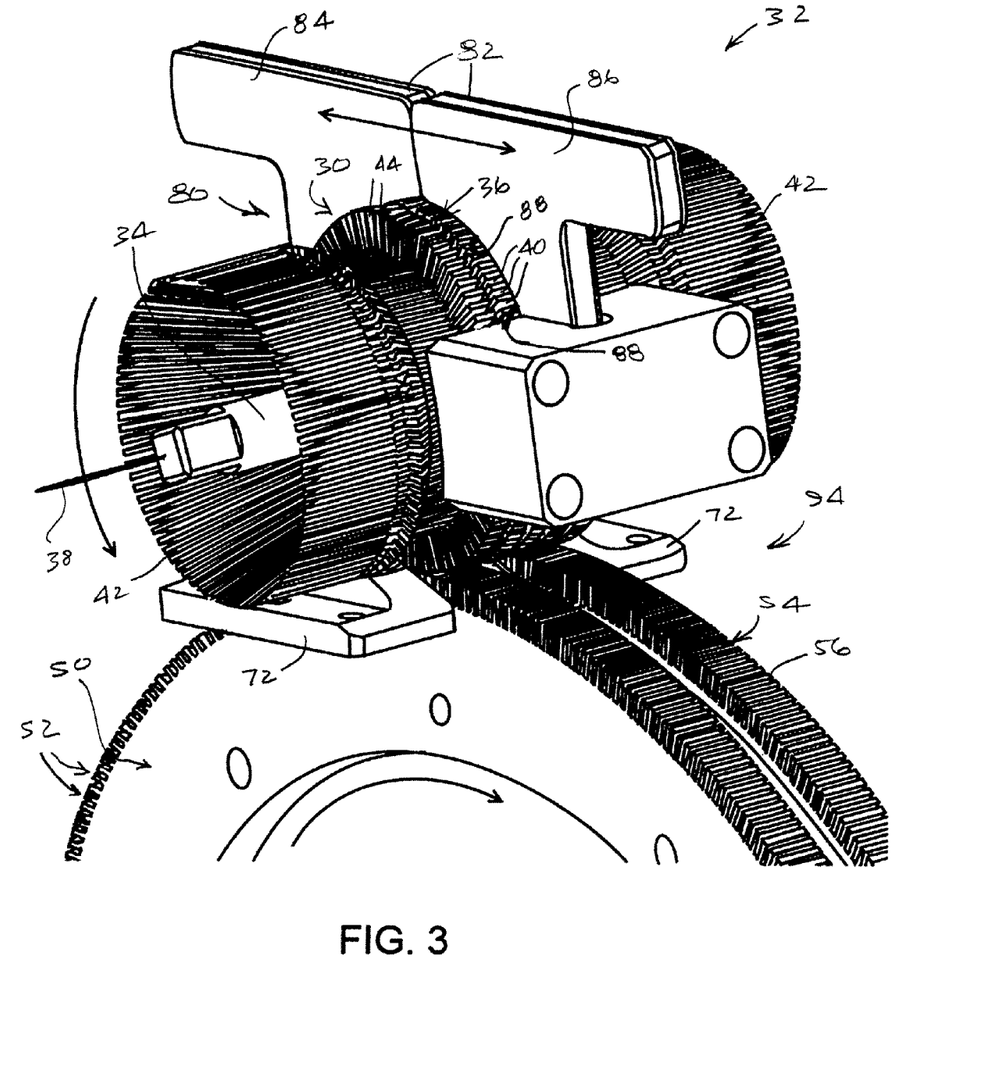
FIG. 3 is another fragmented, partial, perspective view of the apparatus of FIG. 2.

Long, insulated copper wire material having a rectangular cross section, for example, may be used for the stator coil windings, and there may be two conductor axial branches disposed in each stator slot. In other words, two lengths of wire are disposed to line up in one row in a radial direction within each stator core slot, with the rectangular conductor cross-sections aligned in a radial direction. The connection segments of different conductors of the same electrical phase are interconnected to form one of the phase windings, and the interconnections may be done prior to or subsequent to the insertion of the conductors into the stator slots. A conductor 20 intended for installation into a plurality of stator core slots may be formed into an S-style configuration having parallel axial branches 22, each conductor corresponding to a current phase and wound or connected in series in a "wave configuration" with the elongate axial branch portions running in the stator slots of the sequence associated with a particular current phase. FIG. 1 shows a planar projection of a portion of such a conductor.

Conductor wire segment portions referred to herein as head branches 24, extend tangentially relative to the stator bore axis and electrically connect in series the axial branches 22 that are placed in the stator slots. These head branches 24 are placed along at least one of the opposed axial faces of the cylindrical stator core. With the use of this wave winding configuration, each of the three current phases corresponds to a single group of conductors arranged about the stator central axis. Thus, in a three-phase stator, there are three conductor groups. Each conductor group may consist of a single, elongate conductor 20 appropriately formed into an undulating shape, or an interconnected plurality of formed conductors 20 having connection segments 26 that are interconnected, their interconnections preferably being at the same axial end of the resulting stator assembly. One of the two connection segments 26 of conductor 20 is shown in FIG. 1.

The operation of inserting elongate conductors 20 into stator core slots, and the stator assembly described above which results from the apparatus and method herein described, may be substantially as disclosed in incorporated U.S. Pat. No. 2,873,514, and in U.S. Publication No. 2012/0112597 A1, the disclosure of which also is hereby incorporated by reference.

The magazine 30 included in apparatus 32 of the present disclosure is substantially similar to that described in incorporated U.S. Pat. No. 2,873,514, and the drawings thereof may be usefully referred to in the following description. Magazine 30 is provided with central shaft 34 and radially outer cylindrical surface 36 concentric about central axis 38. A plurality of recesses 40 of uniform width extend radially inwardly from cylindrical surface 36 towards axis 38. The conductors 20 are received in the recesses 40 in the magazine load mode, which is depicted in FIGS. 2-6, for subsequent installation into the stator core slots in the magazine installation mode, which is known in the art and substantially as described above and in incorporated U.S. Pat. No. 2,873,514 and U.S. Publication No. 2012/0112597 A1. The magazine load and installation modes are mutually exclusive; i.e., relative to a particular magazine, only one mode may be selected at a time.

In the manufacturing process disclosed herein, the magazine load mode occurs prior to the magazine installation mode, but is discussed further below. The magazine installation mode is known, and is described immediately hereafter. The installation mode entails a magazine 30, carrying formed conductors 20 previously received into magazine recesses 40 in the magazine load mode, being disposed in a surrounding stator core bore. Preferably, in the magazine installation mode, the magazine 30 carries a full complement of conductors 20, i.e., the entire number of conductors 20 to be installed into a stator core, the carried conductors 20 arranged in a configuration corresponding to the desired stator coil winding pattern.

In the magazine installation mode, the conductors 20 to be installed into the annular stator core and carried in radial recesses 40 of magazine 30 are ejected from the magazine 30 and pressed into radially aligned slots of the stator core disposed about the magazine. The magazine 30 fits in the bore of stator core such that its radial recesses 40 are aligned with the stator core slots. The conductors 20, located in the magazine recesses 40, are simultaneously ejected therefrom and inserted into the stator core slots. The ejection of the conductors 20 from the magazine 30, and the pressing of the conductor axial branches 22 into the stator slots, is done by a plurality of circumferentially spaced magazine end members 42 adapted to move blade members (not shown) disposed in the recesses 40 of the magazine beneath the conductor axial branches 22. The blade members are moveable radially towards the outside of the magazine 30 to eject the axial branches 22 of the coil winding conductors from the radial recesses 40 of the magazine 30, and press them into the aligned slots of the stator core in the magazine installation mode.

Once the loaded magazine is disposed within the stator core bore, the magazine 30 in its installation mode is secured between a pair of press unit heads (not shown). The conductor axial branches 42 disposed in the radial recesses 40 of the magazine 30 are forced from the magazine 30 into the stator slots by movement of the press heads axially towards each other, which forces the conductor axial branches 42 radially out of the magazine recesses 40 and into the stator slots from inside to outside.

The radial recesses 40 of the magazine 30 are equal in number to the number of stator slots. Each radial recess 40 of magazine 30 has a uniform circumferential width substantially equivalent to the uniform circumferential width of each stator slot. The width of the magazine recesses 40 correspond to the circumferentially extending cross-sectional dimension of the conductor 20. Thus, the axial branches 42 of the conductors 20, when loaded on magazine 30 are all aligned radially in the respective magazine recesses 40, and in the resulting stator assembly will likewise be aligned radially relative to their respective stator slots.

The width of each magazine recess 40 also corresponds to the thickness of the blade members, and is uniform. The magazine walls 44 separating the magazine recesses 40 are, therefore, wedge-shaped, and are narrower near the magazine's central axis 38 and wider at the radially outer cylindrical surface 36. The widths of the magazine walls 44 at their radially outer ends 46, which define the cylindrical magazine surface 36, are substantially equivalent to the circumferential widths of the stator poles. The stator poles and magazine recess wall radially outer ends 46 are thus of common pitch about their respective center axes.

After the conductors 20 have been inserted in the stator slots, the now-empty magazine 30 is removed from the stator bore, and suitable covers or shims may be placed over the stator slots to mechanically retain the wire coil conductors 20 in position, as disclosed in incorporated U.S. Publication No. 2012/0112597. The covers may include suitable ferromagnetic material sections that enhance passage of magnetic flux through the poles of the stator core. In some stator designs, installation of slot covers to restrain wire coil conductors 20 may not be suitable or required, or may be optional. In a case where the stator core slots have a circumferential width corresponding to the diameter or circumferential width of the conductor 20, the conductor axial branch 22 occupying the radially innermost position, i.e., the position closest to the radially inner cylindrical surface of the stator core bore, is deformed by broadening the conductor 20 in a circumferential direction at discrete locations along the stator bore, thereby bringing the axial branch 22 into compressive abutment with the two opposite radial faces of the stator slot and locking the axial branch 22 in position in the stator slot. The axial branches 22 occupying the other positions are thus held inside the stator core slot. Alternatively, the stator windings inserted into the stator slots may be fixed in place by driving magnetic wedges into the slots. At discrete locations along the stator bore, a wedge or shim may be fixedly driven into the stator slot to prevent the conductors from moving out of their desired positions. Regardless of how this is done, the fixing of the conductors into the stator slots may be carried out after insertion of the conductors into the stator slots, along each stator slot.

The magazine load mode and antecedent process operations will now be described. Prior to the apparatus being in its magazine load mode, each conductor 20 is conformed into a desired shape, such as that of the undulating, S-type conductor having at least two substantially parallel axial branches 22 and a head branch 24 connecting the two axial branches 22, such as shown in FIG. 1. If each conductor 20 includes only two axial branches, the head branches 24 of the conductors may be all disposed on the same axial side of a circular rack 50 of the apparatus 32. Alternatively, if each conductor 20 includes more than two axial branches 22 (as depicted in FIG. 1), the head branches 24 may alternate between opposite axial sides of the circular rack 50 and the opposite axial ends of the stator core when installed therein. The longitudinal ends of the conductor defining connection segments 26 are preferably located on a common axial side of the circular rack 50 and thus a common axial end of the stator core in which the conductors 20 are to be installed, which facilitates their interconnection to connection segments 26 of other conductors 20 of the same phase winding directly or through a buss bar assembly as mentioned above.

The shaping of the conductors 20 may involve the use of a coil-form or mandrel (not shown) prior to the formed conductors 20 being disposed in circular rack 50. For example, the stator conductors may first be formed on a separate mandrel in a wave or S-shaped configuration, and then transferred to rack slots 52 provided in circular rack 50. The rack slots 52 are open toward the outer circumferential surface 54 of the circular rack outer perimeter 56, and regularly distributed circumferentially along the perimeter 56 at a constant separation distance or pitch between adjacent rack slots 52, which matches the pitch of magazine recesses 40. The rack slots 52 extend generally axially relative to the central axis of rotation (not shown) of circular rack 50, and circumferentially adjacent rack slots 52 are parallel, though they may extend in directions inclined relative to the rack central axis.

Alternatively, circular rack 50 itself may serve as a mandrel, with unformed conductors 20 each disposed in a rack slot 52 and shaped into their desired configurations on the circular rack 50. Assuming the circular rack 50 is to serve as a mandrel on which conductors 20 are shaped, unformed elongate conductors 20 are disposed parallel to each other in rack slots 52, and then folded and bent into the desired stator winding configuration corresponding to the winding configuration desired for the resulting stator assembly. In other words, each conductor 20, once placed in a rack slot 52, is then formed into its desired shape and positioned in other, designated rack slots 52 so as to correspond to the desired winding pattern of the resulting stator. This shaping is repeated for all conductors 20 of a stator assembly. The circular rack 50 is thus filled with formed conductors 20 intended for installation into a stator core.

Figure 6:
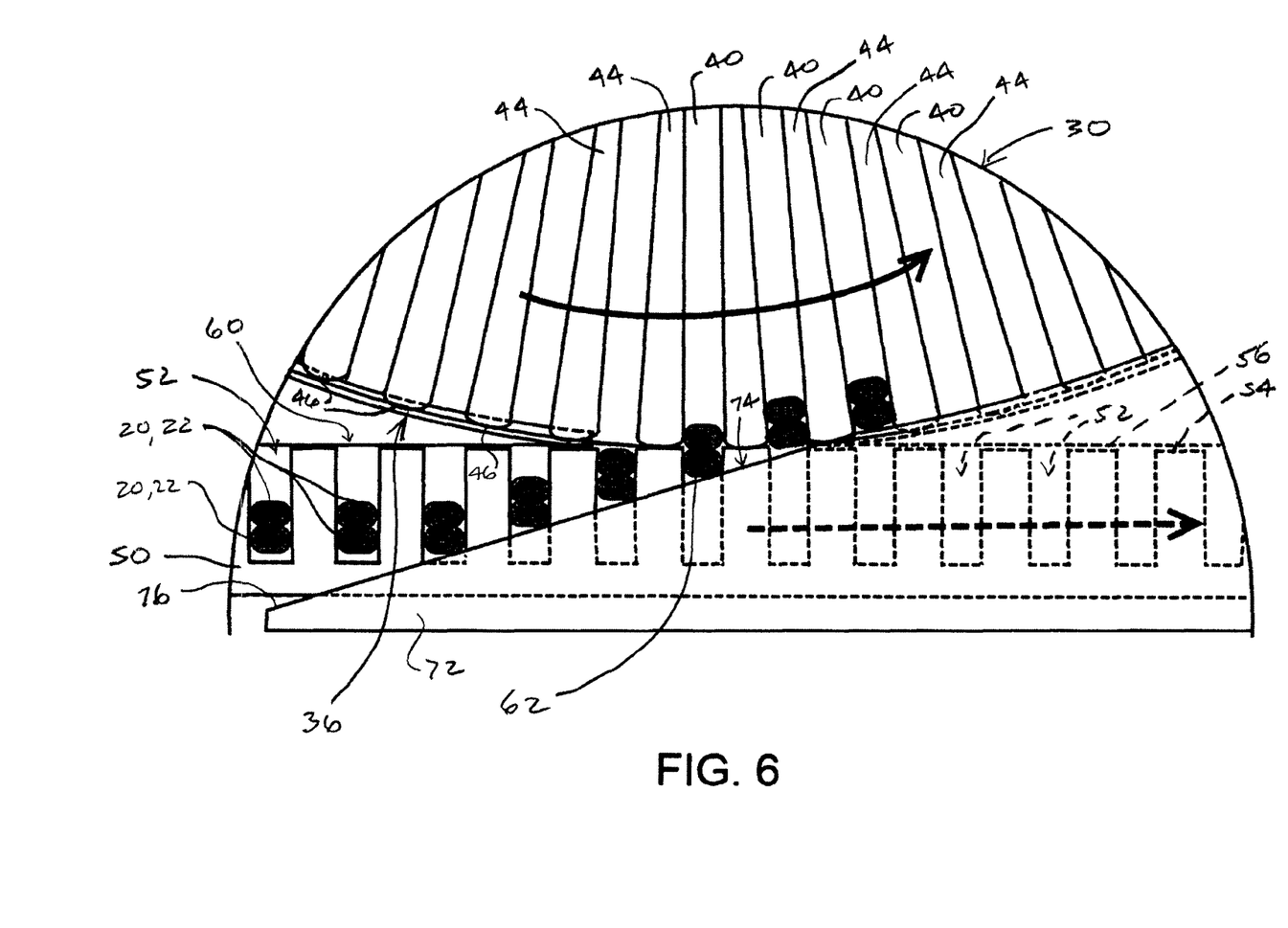
FIG. 6 is a further enlarged view of FIG. 5, showing transference of conductor axial branches from the circular rack slots to the magazine recesses as the circular rack and magazine synchronously rotate.

In the magazine load mode, the cylindrical outer surface 36 of the magazine 30 is positioned adjacent the perimeter 56 of the circular rack 50 with their respective central axes substantially parallel. In the magazine load mode, the circular rack 50 and magazine 30 are coupled together, and rotatably driven simultaneously about their respective central axes by any suitable drive means, such as a servo or stepper motor and/or a linking belt. The radially outer surfaces 54, 36 of the circular rack 50 and the magazine 30 interface on opposite sides of a plane of mutual tangency, herein referred to as transfer plane 60. Transfer plane 60 has at least one point of tangency 62 with both the circular rack perimeter 56 and the magazine outer radial surface 36, and they have a common tangential speed and direction in transfer plane 60. Circular rack 50, loaded with formed conductors 20 intended for installation into a stator, and magazine 30 rotate in synchronicity such that in transfer plane 60, slots 52 of circular rack 50 are sequentially aligned with radial recesses 40 of magazine 30, with the axial branches 22 of conductors 20 carried by circular rack 50 coming to be transferred portion-by-portion, that is, axial branch-by-axial branch, from each rack slot 52 in turn to the respective magazine recess 40 aligned therewith at tangency point 62, as best seen in FIG. 6. The sequential transfers of the conductor axial branches 22 between aligned pairs of rack slots 52 and magazine recesses 40 are each through transfer plane 60.

The central axes of the circular rack 50 and the cylindrical magazine 30, about which they are respectively rotatable, are generally parallel but may be slightly inclined relative to each other. Though mutually inclined, these axes may, however, each be parallel with transfer plane 60.

In the magazine load mode, the circular rack 50 and the magazine 30 are both rotatably mounted to base 70 of apparatus 32. The transfer of conductors 20 from the rack slot 52 and into the aligned magazine recess 40 occurs during, and as consequence of, their movements relative to apparatus base 70. Wedges 72 having ramp surfaces 74 are fixed to apparatus base 70 and disposed on opposite axial sides of the circular rack 50. The ramp surfaces 74 are closely adjacent to the cylindrical surface 36 of magazine 30. The ramp surfaces 74 are slidably engaged by conductor axial branches 22, and sequentially urge the conductors 20 in a radial direction away from the circular rack axis of rotation, out of their respective rack slots 52, and into the respective, aligned magazine recess 40, as circular rack 50 rotates. Wedges 72 each have a leading edge 76 disposed slightly upstream of the point of tangency 62 of magazine 30 and rack 50, relative to their common tangential direction of travel in transfer plane 60. Downstream of their leading edges 76, the ramped surfaces 74 of wedges 72 bear on the axial branches 22 of the conductors 20 and urge them away from the circular rack central axis and towards magazine central axis 38. Ramped surfaces 74 may be substantially curved as shown, defining a concave profile that at least partially conforms to magazine cylindrical surface 36.

Axial branches 22 of conductors 20 disposed in each rack slot 52 approaching point of tangency 62 slidably engage the ramped surfaces 74 and, near and after point of tangency 62, are directed by ramped surfaces 74 into the magazine radial recess 40 aligned through the point of tangency 62 with the rack slot 52. As shown in FIG. 6, two axial branches 22 may be transferred between a rack slot 52 and a magazine recess 40 as the circular rack 50 and magazine 30 rotate in synchronicity.

In apparatus 32, magazine 30 is fixtured while in the load mode such that it turns inside of a mount 80 secured to apparatus base 70. Mount 80 rotatably supports magazine 30 by its central shaft 34 and has an encircling portion 82 that substantially surrounds the cylindrical surface 36 of magazine 30. According to one embodiment of apparatus 32, shown in FIGS. 2 and 3, the encircling portion 82 of mount 80 includes a pair of separable halves 84, 86 that together define an internal, cylindrical face 88 which closely encircles the magazine cylindrical surface 36. Internal face 88 of the mount encircling portion 82 keeps the axial branches 22 engaged inside the radial recesses 40 of magazine 30.

Figure 4:
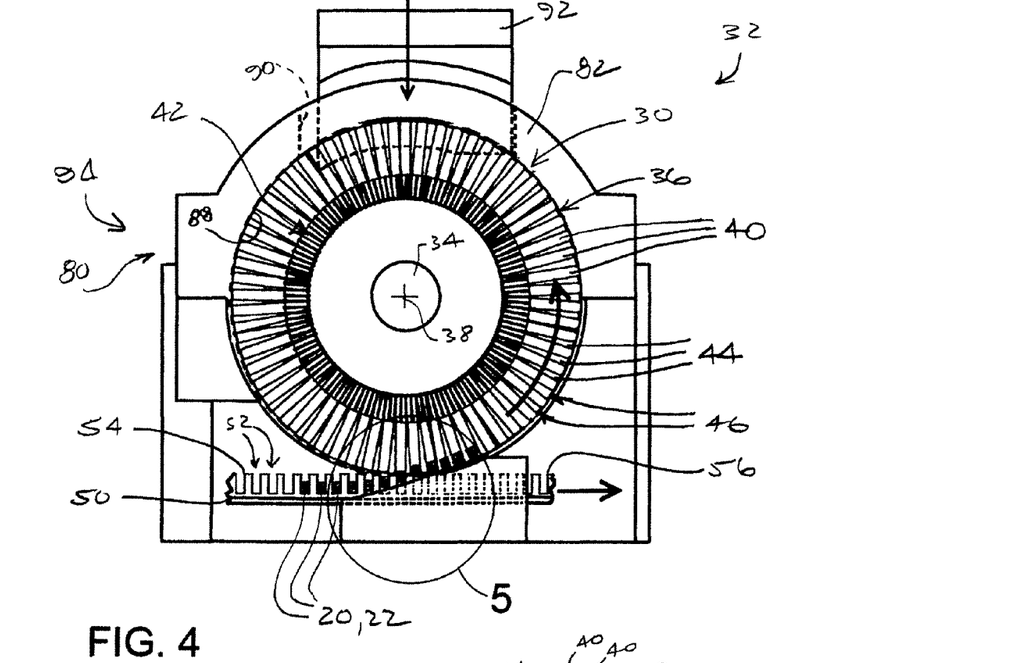
FIG. 4 is a partial plan view of an alternative embodiment of the apparatus in the magazine load mode, the circular rack periphery portion shown as a planar projection.
Figure 5:
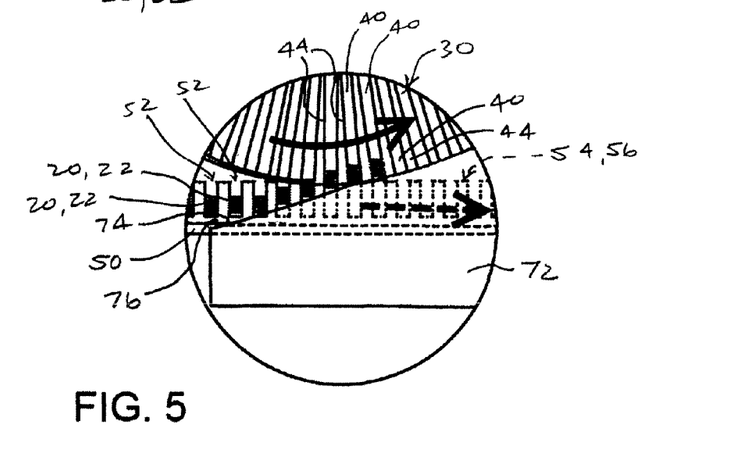
FIG. 5 is an enlarged view of encircled portion 5 of FIG. 4.

An alternative embodiment of apparatus 32 shown in FIG. 4 provides a mount 80 having an encircling portion 82 having a guide slot 90 through which a ram 92 is slidably positioned relative to magazine central axis 38. Ram 92 is located axially adjacent the magazine cylindrical surface 36, and is extendable radially inward of the outer radius of magazine cylindrical surface 36. Ram 92 reciprocatively slides in directions substantially perpendicular to the magazine central axis 38 for tamping the transferred conductors 20 radially into magazine recesses 40, thereby ensuring a compact, abutting, radially-stacked arrangement of conductor axial branches 22 within recesses 40.

In the load mode, during the conductor transfer operation, magazine 30 may make a complete, 360° rotation about its central axis 38 while the circular rack 50 rotates only partially about its central axis. Thus, a magazine 30 may receive a full complement of formed conductors upon one complete rotation after first receiving a conductor axial branch 22, and after only a partial rotation of circular rack 50, which is of much greater diameter. The number of rack slots 52 may be an integer multiple of the number of magazine recesses 40. Therefore, a plurality of magazines 30 may be fully loaded with formed conductors 20 from a single, fully loaded circular rack 50.

Relative to the outer diameter and number of recesses 40 of the magazine 30, which correspond to the inner diameter of and number of slots in a cylindrical stator core bore, the outer diameter and number of slots of the circular rack 50 is substantially greater. Consequently, the circular rack 50 may be provided with a number of conductors 20 sufficient to load multiple magazines 30, either sequentially or simultaneously.

It is envisioned that multiple magazines 30 may be interchanged at a single conductor transfer station 94 of apparatus 32 that is passed by the circumference 54 of the circular rack 50 as it rotates about its central axis. At the transfer station 94, each of a sequence of magazines 30 enters its load mode and is filled in turn with sufficient conductors to entirely form its stator winding during a partial rotation of the circular rack 50. The magazines 30 of the sequence are interchanged for sequential loading from a common circular rack 50. The loaded magazines 30 may be transitioned to an installation station (not shown) at which it enters a magazine installation mode, with a stator core disposed about the filled magazine 30. In the installation mode, conductors 20 carried by the magazine 30 are inserted into the stator slots in a conductor installation operation as described above.

It is also envisioned that, in the alternative, multiple transfer stations 94 may be positioned about the perimeter 56 of the circular rack 50, with multiple magazines 30 receiving conductors 20 transferred from the circular rack 50 simultaneously, as the rack 50 and the magazines 30 rotate about their respective central axes. In other words, a plurality of magazines 30 may be positioned about the perimeter 56 of a single circular rack 50 and simultaneously receive their respective conductors 20 therefrom in the magazine load mode.

Thus, in the magazine load mode, the conductors 20 from circular rack 50 are transferred in apparatus 32 to one or a plurality of cylindrical magazines 30.

While exemplary embodiments have been disclosed hereinabove, the present disclosure is not limited to the disclosed embodiments. Instead, this application is intended to cover any variations, uses, or adaptations of the present disclosure using its general principles. Further, this application is intended to cover such departures from the present disclosure as come within known or customary practice in the art to which this present disclosure pertains and which fall within the limits of the appended claims.

What is claimed is:

1. An apparatus for installing an elongate conductor having a plurality of axial branches into stator core slots that extend outwardly into the cylindrical surface of a stator core bore, the apparatus comprising:

a magazine having a central axis and a radially outer cylindrical surface disposed thereabout, the magazine provided with a plurality of recesses that extend inwardly of the cylindrical surface towards the central axis; and a circular rack having a radially outer periphery provided with a plurality of rack slots, the magazine and circular rack each capable of carrying at least one conductor intended for installation into a plurality of stator core slots;

wherein the magazine has an installation mode in which a stator core coaxially surrounds the magazine, there is concurrent radial alignment between each of a plurality of pairs of magazine recesses and stator core slots, and at least one conductor axial branch is receivable by a stator core slot from a respectively paired magazine recess; and wherein the magazine has a load mode in which the circular rack and the magazine have synchronized rotative movements, corresponding pairs magazine recesses and rack slots are sequentially aligned, and at least one conductor axial branch is receivable by a magazine recess from its aligned rack slot.

2. The apparatus of claim 1, wherein the magazine recesses and the rack slots have substantially identical circumferential widths.

3. The apparatus of claim 1, wherein circumferentially adjacent magazine recesses and rack slots are respectively spaced circumferentially at substantially identical distances.

4. The apparatus of claim 1, wherein the circular rack has an axis of rotation, the rack axis of rotation and magazine central axis substantially parallel in the magazine load mode.

5. The apparatus of claim 1, wherein the circular rack has an axis of rotation, adjacent rack slots extend in substantially parallel slot directions relative to each other, and the rack axis of rotation and each slot direction are oriented in different directions.

6. The apparatus of claim 1, wherein in the magazine load mode, the circular rack perimeter and the magazine cylindrical surface interface through a transfer plane tangential to the circular rack perimeter and the magazine cylindrical surface, and each conductor axial branch receivable by a magazine recess from its aligned rack slot is transferrable from the circular rack to the magazine through the transfer plane.

7. The apparatus of claim 6, wherein the circular rack perimeter is concentric with a rack axis of rotation, and the transfer plane is parallel with the rack axis of rotation and the magazine central axis.

8. The apparatus of claim 1, further comprising a ramp surface axially adjacent the circular rack perimeter and facing towards the magazine cylindrical surface in the magazine load mode, the ramp surface capable of being slidably engaged by conductors carried by the circular rack, the axial branch of a conductor slidably engagable with the ramp surface urged by the ramp surface from a rack slot into its aligned magazine recess in response to rotative movements of the circular rack in the magazine load mode.

9. The apparatus of claim 1, wherein the number of rack slots is an integer-multiple of the number of magazine recesses.

10. The apparatus of claim 1, wherein the apparatus comprises a plurality of magazines circumferentially disposed about the circular rack perimeter in the magazine load mode.

11. The apparatus of claim 10, wherein the plurality of magazines is simultaneously receivable of conductors from the circular rack in the magazine load mode.

12. The apparatus of claim 10, wherein the plurality of magazines is simultaneously disposed in respective stator core bores in the magazine installation mode.

* * * * *